United States Patent
Dongre et al.

(10) Patent No.: US 10,637,758 B2
(45) Date of Patent: Apr. 28, 2020

(54) METHODS FOR NETWORK CONNECTIVITY HEALTH CHECK AND DEVICES THEREOF

(71) Applicant: JPMorgan Chase Bank, N.A., New York, NY (US)

(72) Inventors: Atul Suresh Dongre, Singapore (SG); Srikanth Mittapalli, Hyderabad (IN); Sayan Mahalanobis, Singapore (SG); Rajani Vanamala, Telangana (IN); Sreenu Daram, Singapore (SG); Zubair Mohammed, Telangana (IN); Siva Kumar Chetla, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 87 days.

(21) Appl. No.: 15/846,322

(22) Filed: Dec. 19, 2017

(65) Prior Publication Data

US 2019/0356568 A1    Nov. 21, 2019

Related U.S. Application Data

(60) Provisional application No. 62/435,903, filed on Dec. 19, 2016.

(51) Int. Cl.
*G06F 15/16*      (2006.01)
*H04L 12/26*      (2006.01)

(52) U.S. Cl.
CPC ........ *H04L 43/0811* (2013.01); *H04L 43/065* (2013.01)

(58) Field of Classification Search
CPC .......................... H04L 43/0811; H04L 43/065
See application file for complete search history.

(56) References Cited

U.S. PATENT DOCUMENTS

| | | | |
|---|---|---|---|
| 2004/0010586 A1* | 1/2004 | Burton | H04L 41/0681 709/224 |
| 2008/0082661 A1* | 4/2008 | Huber | H04L 41/046 709/224 |
| 2009/0288095 A1* | 11/2009 | Donadeo | G06F 9/505 718/105 |

\* cited by examiner

*Primary Examiner* — Normin Abedin
(74) *Attorney, Agent, or Firm* — Greenblum & Bernstein, P.L.C.

(57) ABSTRACT

Methods, non-transitory computer readable media, and health check devices that determine one or more network component devices associated with a received host network identifier. One or more health check job types associated with the determined one or more network component devices are identified. One or more selections of the identified health check job types for execution are received and the selected one or more health check job types are executed. A determination is made of when one or more health check rules are satisfied based on the execution of the one or more health check job types. One of one or more alert notifications are identified when the determination indicates that the one or more health check rules are satisfied. The identified one or more alert notifications are displayed.

8 Claims, 15 Drawing Sheets

Check Type Array:

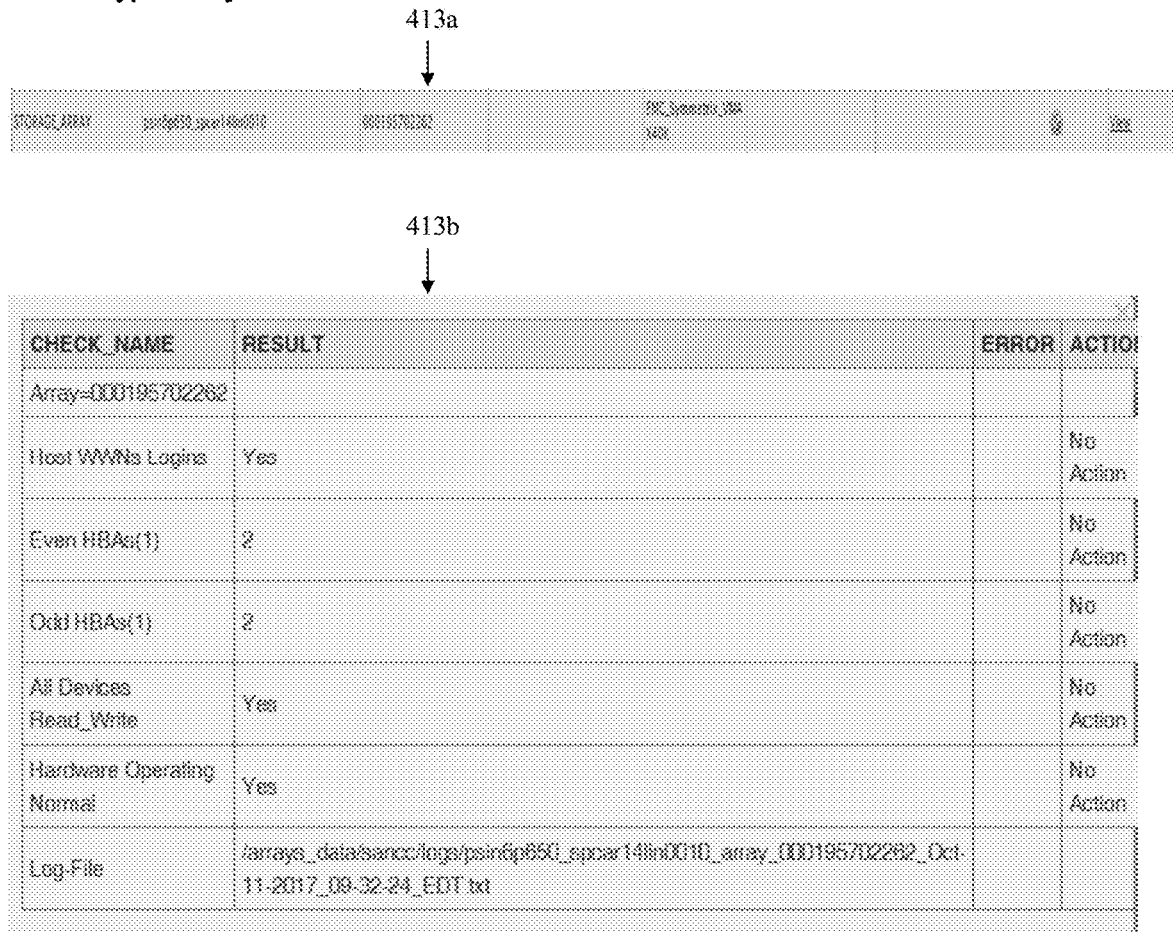

| | |
|---|---|
| If all the rows reported as YES and HBA count is matched on both sides (even & odd). - Then the alert notification is GREEN | |
| If all the rows reported as YES and HBA count is not matched on both sides (even & odd). Then the alert notification is AMBER | |
| If "Host WWNs Logins" row reported as NO. Then the alert notification is RED. | |
| If "HBAs" count is 0 (either Even or Odd). Then the alert notification is RED. | |
| If "Devices Read_Write" reported as NO. Then the alert notification is RED. | |
| If "Hardware operating" reported as NO. Then the alert notification is RED. | |

FIG. 4H

Database check

500 ⟶

| Health Check Type | Description | Details | Status |
|---|---|---|---|
| OEM Target status | Checking OEM Target status (primary and standby) | Targets up: 23 | GREEN |
| Standby Apply status | Checking For Standby Apply status In Database | Standby apply LAG (in seconds): 9 | GREEN |
| Blocking Sessions | Checking For Blocking Sessions In Database | Identified Sessions : 0 | GREEN |
| Checking Locked & Expired Users | Checking Locked & Expired Users Last 48 Hours | Identified Users : 6 | AMBER |
| Current Running Sessions Check | Sessions are active from more then 1 Hour | Identified Sessions : 0 | GREEN |
| Unusable Indexes | Identifying Indexes in UNUSABLE Status | Unusable Indexes : 0 | GREEN |
| Full Table Scans | Identifying Large Table Full Scans | Full Table Scans : Less than 1 Million | GREEN |
| Datapump and RMAN | Checking if RMAN and Export/Import is Active | Nothing Identified | GREEN |
| Tablespace Usage | Checking Available Freespace to Extend 10% AMBER, 5% RED | Usage is below 90% | GREEN |
| UNDO Tablespace Usage | Checking Usage Percentage 90% AMBER, 95% RED | Identified Usage > 95% | RED |
| Temporary Tablespase Usage | Checking Usage Percentage 90% AMBER, 95% RED | Usage is below 90% | GREEN |
| Flashback Recovery Area Usage | Checking Usage Percentage 90% AMBER, 95% RED | Usage is below 90% | GREEN |
| ASM Diskgroup Space | Checking Usage Percentage 90% AMBER, 95% RED | Usage is below 90% | GREEN |
| Block Corruption | Checking for Block Corruptions In Database | No Blocks Identified | GREEN |
| Invalid Objects | Checking Count of Invalid Objects Schema Wise | Schemas with Invalid Objects : 3 | WARNING |
| Datafile Status | Checking for OFFLINE/RECOVER Status Datafiles | Nothing Identified | GREEN |

FIG. 5A

| Rules | Linux Operating System | AIX Operating System |
|---|---|---|
| Operating System check 510 | • Compare sysctl params from /etc/sysctl.conf file with Runtime values and raise error if different<br>• Raise error if system uptime is more than 90 days threshold<br>• Raise error if swap usage is more than 75% threshold<br>• Raise error if some runaway RC Scripts are still running.<br>• Raise error if current CPU usage is more than 75%<br>• Raise error if 15 min CPU load average is more than "Num of vcpu if HyperThreading is disbaled" / half the num of vcpu if HyperThreading enabled"<br>• Raise error if number of defunct process is more than 50 threshold<br>• Raise error if critical processes are not running<br>• Raise warning if System Uptime is more than 90 days | • Reports error if the mksysb is not recent and an updated mksysb should be created before implementing any changes.<br>• Reports error if the last mksysb command was not successful then another mksysb should be executed before proceeding with any changes.<br>• Reports error if the altinst_rootvg is not recent and an updated altinst_rootvg should be created before implementing changes.<br>• Report error is filesets are not in a consistent state.<br>• Reports on the last boot device and a post check may report an error if the system was suppose to boot from another device. |
| File System Check 520 | • Raise error if any LVM LV is not Available/Active(a)<br>• Raise error if any LVM LV Snapshot is not Writeable(w)<br>• Raise error if any LVM VG is not Writeable(w)<br>• Raise error if any LVM VG is Exported(x)<br>• Raise error if any LVM VG is Partial (missing one or more PV's) (p)<br>• Raise error if Pre/Post output of 'lvs' & 'vgs' commands do not match<br>• Raise error if any VxDG state is not ENABLED<br>• Raise error if any VxVOL KSTATE is not ENABLED<br>• Raise error if any VxPLEX KSTATE is not ENABLED<br>• Raise error if Pre/Post output of 'vxdg list' command does not match<br>• Raise error if mount defined in /etc/fstab are not in /proc/mounts<br>• Raise warning if root and /var filesystem has less than 1GB free space | • Report error if a LV is not set to read/write mode. There maybe some cases where it where a LV could be read only.<br>• Report error if all LPs are not in a sync state.<br>• Report error if there are stale LPs if a mirrored copy is not consistent.<br>• Reports error if a mirrored copy is not using separate physical disks. |
| Hardware Check 530 | • Raise error if there is CPU related errord<br>• Raise error if there is DAID Disk & controller related failures<br>• Raise error if there is power supply related failures<br>• Raise error if there is cooling Fan related failures<br>• Raise error if there is Voltage sensor errors | • Report error if there is disk failure based on the Virtual IO servers.<br>• Report error if there is disk failures based on the physical adapters.<br>• Report error if there is failure paths.<br>• Report the errpt permanent errors for each HBA/disks.<br>• Report warning if all the failed disks from single VIOS.<br>• Report warning if all the failed disks from single HBA.<br>• Report error if the disk path failures from multiple VIOS.<br>• Report error if the disk path failures from multiple HBA |

FIG. 5B

| | Check | Fail |
|---|---|---|
| Network Check 540 | • Raise error if NIC has IP but no Link detected (LLT int has link)<br>• Raise error if NIC is half duplex<br>• Raise error If bond is not Active-Passive (JP Standard)<br>• Raise error If bond has less than 2 slaves | |
| Storage Check 550 | • Raise error if /var/gtitools/bin/x3_srdf_check shows PROBLEM<br>• Raise error if /var/gtitools/bin/x3_hds_rep_check shows PROBLEM<br>• Raise error if /var/gtitools/bin/x3_san_mpchk_mpath shows PROBLEM<br>• Raise error if /var/gtitools/bin/x3_san_mpchk_vx shows PROBLEM | |
| Cluster Check 560 | • Raise error if hastatus -sum output contains any ERROR or WARNING<br>• Raise error if Any Node is not in RUNNING state<br>• Raise error any GROUP is not in ONLINE/OFFLINE state<br>• Raise error any GROUP is in AUTO-DISABLED state ???<br>• Raise error any RESOURCE Failure<br>• Raise error any AGENT Failure<br>• Raise error if gabconfig -a output contains the word jeopardy<br>• Raise error if lltstat -nv shows less number of link compared to /etc/lltstat of the current cluster node | • Raise error if the cluster state and resource is unavailable.<br>• Raise error if the cluster manager, resource not in ready state. |
| VIOS Check 570 | | • Report warning if any of the vscsi disks in other than Available state.<br>• Report warning if any of the NPIV adapter in other than "LOGGED IN" state.<br>• Report error if any of the SEA state not in PRIMARY/BACKUP.<br>• Report error if the Link status of SEA not UP state.<br>• Report error if the Link state of a SEA not in UP state.<br>• Report warning Logical Port Link state of LHEA not in UP state. |

FIG. 5C

METHODS FOR NETWORK CONNECTIVITY HEALTH CHECK AND DEVICES THEREOF

This application claims the benefit of U.S. Provisional Patent Application Ser. No. 62/435,903 filed Dec. 19, 2016, which is hereby incorporated by reference in its entirety.

FIELD

This technology generally relates to enterprise networks and, more particularly, to methods and devices for improved network connectivity health check determination.

BACKGROUND

A typical computer network environment may include storage area networks (SANs), host devices, server devices and databases. SANs are high speed networks of storage devices and switches connected to host server computer devices and are used to consolidate storage devices. A SAN includes one or more servers attached to a storage array using one or more SAN switches SAN switches connect various elements of the SAN, such as hosts and storage arrays. The SAN fabric is the network portion of the SAN. A fabric is created when one or more SAN switches are connected.

A SAN can include multiple interconnected fabrics. Fabric components can include, for example, switches, data routers, and cables using a communications protocol. Host servers may connect to the fabric through a host bus adapter (HBA). Storage devices may connect to fabric ports through storage processors. Further, databases, such as an Oracle database, are also connected to the network and communicate with the storage area networks. SANs present shared pools of storage devices to multiple servers and each of the multiple servers is able to access the storage as if the storage were directly attached to the server. SANs allow for movement of data between various storage devices, share data between multiple servers, and backup and restore data rapidly and efficiently. Sharing storage through the use of a SAN can simplify storage administration and allow for quick and easy replacement of faulty servers.

When users of a SAN detect occurrence of an incident, the users are unaware of the source of the incident. It is difficult to perform a health check for each of the individual components of a SAN and of databases connected in the computer network environment. Typically in a SAN, in order to check the health of individual components, users are required to log in to each system or component individually in order to determine its status. This process can be inconvenient and time consuming.

SUMMARY

A method for improved network connectivity health check implemented by one or more health check devices includes determining one or more network component devices associated with a received host network identifier. One or more health check job types associated with the determined one or more network component devices are identified. One or more selections of the identified health check job types for execution are received and the selected one or more health check job types are executed. A determination is made of when one or more health check rules are satisfied based on the execution of the one or more health check job types. One of one or more alert notifications are identified when the determination indicates that the one or more health check rules are satisfied. The identified one or more alert notifications are displayed.

A health check device includes memory comprising programmed instructions stored thereon and one or more processors configured to be capable of executing the stored programmed instructions to determine one or more network component devices associated with a received host network identifier. One or more health check job types associated with the determined one or more network component devices are identified. One or more selections of the identified health check job types for execution are received and the selected one or more health check job types are executed. A determination is made of when one or more health check rules are satisfied based on the execution of the one or more health check job types. One of one or more alert notifications are identified when the determination indicates that the one or more health check rules are satisfied. The identified one or more alert notifications are displayed.

A non-transitory computer readable medium having stored thereon instructions for improved network connectivity health check includes executable code which when executed by one or more processors, causes the processors to determine one or more network component devices associated with a received host network identifier. One or more health check job types associated with the determined one or more network component devices are identified. One or more selections of the identified health check job types for execution are received and the selected one or more health check job types are executed. A determination is made of when one or more health check rules are satisfied based on the execution of the one or more health check job types. One of one or more alert notifications are identified when the determination indicates that the one or more health check rules are satisfied. The identified one or more alert notifications are displayed.

This technology has a number of associated advantages including providing methods, non-transitory computer readable media, and health check devices that optimizes the monitoring of health checks of individual components within a network. With this technology, optimized process of determining health status of multiple network devices connected over a network efficiently is provided. This technology facilitates monitoring network system issues associated with network devices and provide warnings to the system administrator in time before failure of the network. Accordingly, this technology reduces the effort for administrators by providing multiple system checks for multiple network devices across a network in a single view.

BRIEF DESCRIPTION OF THE DRAWINGS

FIGS. 4G-H is a screen shot illustrating a user interface showing further results of a health check job submission in accordance with an embodiment of the invention;

FIG. 5A shows a table illustrating health check rules associated with database monitoring; and FIGS. 5B-5C shows tables illustrating health check rules associated with various operating system monitoring.

DETAILED DESCRIPTION

Figure 1:
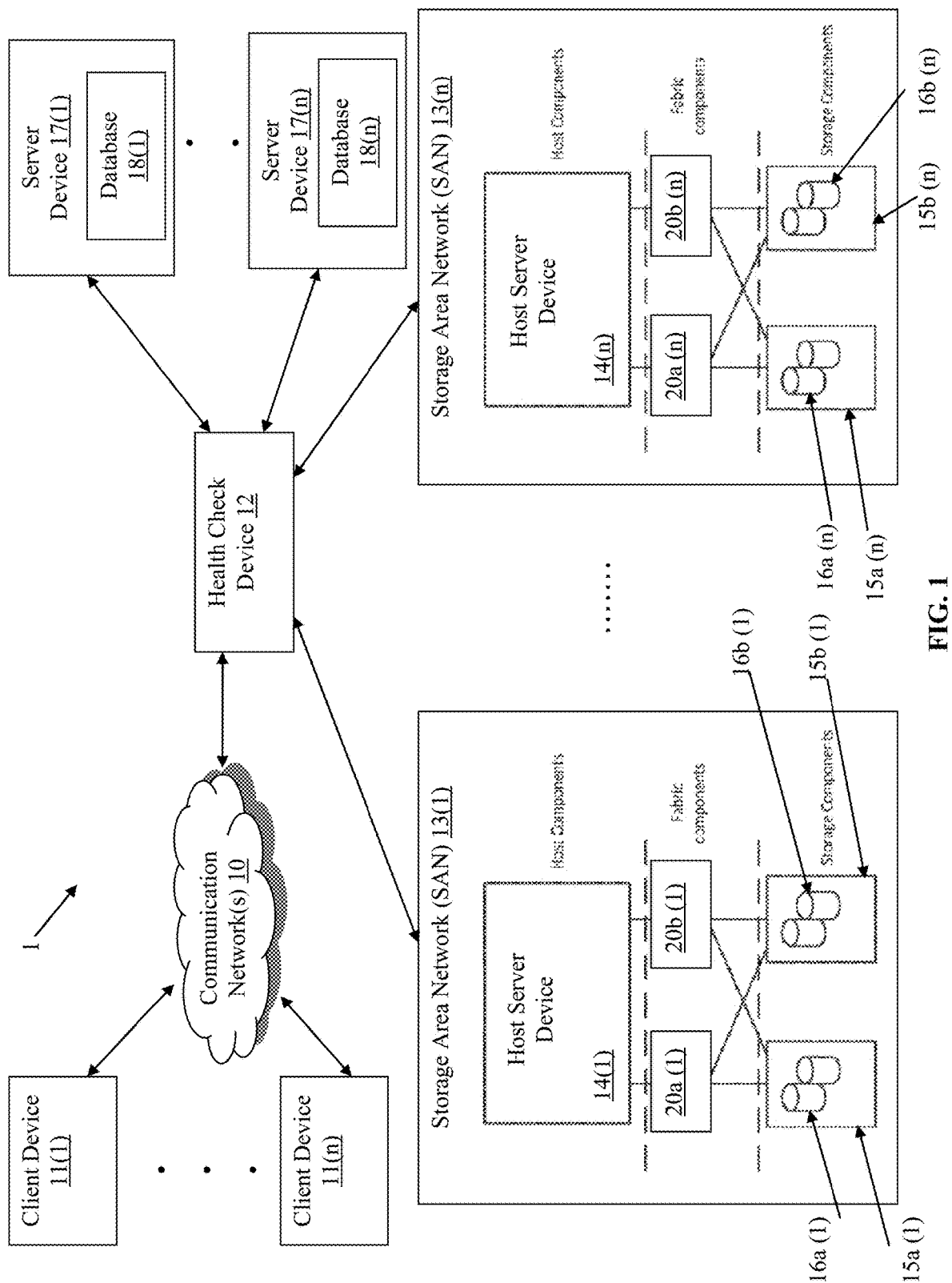
FIG. 1 is a block diagram of an exemplary network environment with an exemplary health check device.

Referring to FIG. 1, an exemplary network environment 1 with an exemplary health check device 12 is illustrated. The health check device 12 in this example is coupled to a plurality of storage area networks (SANs) 13(1)-13(n) and server devices 17(1)-17(n), via communication network(s) 10, client devices 11(1)-11(n), although the health check device 12, storage area networks (SANs) 13(1)-13(n), server devices 17(1)-17(n), and/or client devices 11(1)-11(n), may be coupled together via other topologies. Each of the SANs 13(1)-13(n) hosts a host server device 14(1)-14(n), fabric components 20a(1)-20a(n) and 20b(1)-20b(n) and storage components 15a(1)-15a(n) and 15b(1)-15b(n). The storage components 15a(1)-15a(n) and 15b(1)-15b(n) may further include storage arrays 16a(1)-16a(n) and 16b(1)-16b(n). Each of the server devices 17(1)-17(n) hosts databases 18(1)-18(n). This technology provides a number of advantages including methods, non-transitory computer readable media, and health check devices that optimizes the monitoring of health checks of individual components within a network.

Figure 2:
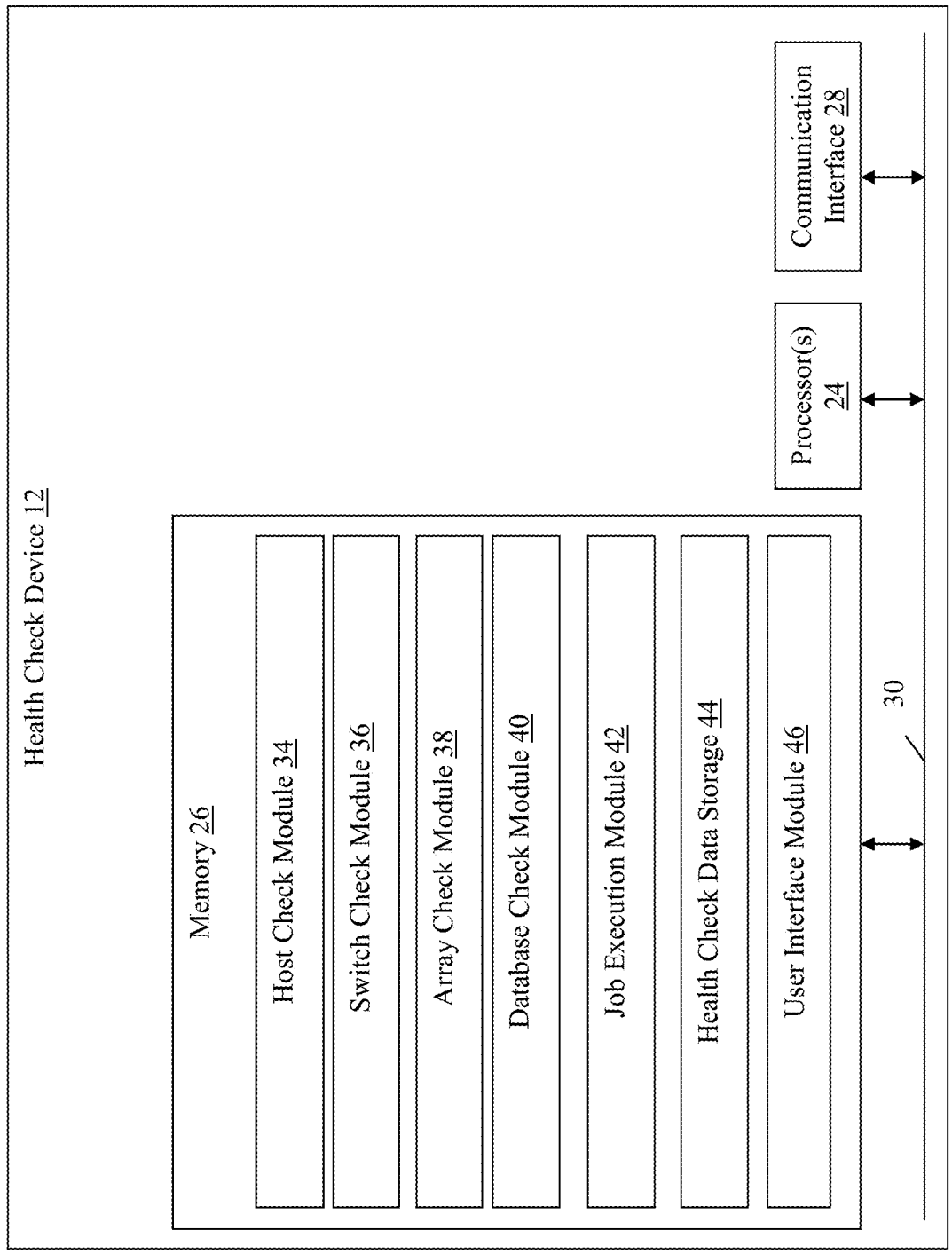
FIG. 2 is a block diagram of the exemplary health check device of FIG. 1.

Referring to FIGS. 1-2, the health check device 12 in this example includes one or more processors 24, a memory 26, and/or a communication interface 28, which are coupled together by a bus 30 or other communication link, although the health check device 12 can include other types and/or numbers of elements in other configurations. The processor(s) 24 of the health check device 12 may execute programmed instructions stored in the memory 26 for the any number of the functions described and illustrated herein. The processor(s) 24 of the health check device 12 may include one or more CPUs or general purpose processors with one or more processing cores, for example, although other types of processor(s) can also be used.

The memory 26 of the workload scheduler device 12 stores these programmed instructions for one or more aspects of the present technology as described and illustrated herein, although some or all of the programmed instructions could be stored elsewhere. A variety of different types of storage devices, such as random access memory (RAM), read only memory (ROM), hard disk, solid state drives, flash memory, or other computer readable medium which is read from and written to by a magnetic, optical, or other reading and writing system that is coupled to the processor(s) 24, can be used for the memory 26.

Accordingly, the memory 26 of the health check device 12 can store one or more applications that can include executable instructions that, when executed by the health check device 12, cause the health check device 12 to perform actions, such as to transmit, receive, or otherwise process network messages, for example, and to perform other actions described and illustrated below with reference to FIGS. 3-5C. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the health check device 12 itself, may be located in virtual server(s) running in a cloud-based computing environment rather than being tied to one or more specific physical network computing devices. Also, the application(s) may be running in one or more virtual machines (VMs) executing on the configuration health check device 12.

In this particular example, the memory 26 of the health check device 12 includes a code execution module 32, a host check module 34, a switch check module 36, a array check module 38, database check module 40, job execution module 42, health check data storage 44 and user interface module 46 although the memory 26 can include other policies, modules, databases, or applications, for example. The health check data storage 44 includes data such as health check rules as shown in FIGS. 5A-5C and which can further include a table, database, or other data structure storing health check rules associated with network components, although other information can also be included in the health check data storage 44. The code execution module 32 in this example is utilized to execute code on the host server devices 14(1)-14(n). The user interface module 46 is utilized to generate and display alert notifications based on the health check of the network components at the client devices 11(1)-11(n).

The host check module 34 in this example is utilized to check the heath status of host server devices 14(1)-14(n) in the SANs 13(1)-13(n). The host check module 34 utilizes various rules stored in the health check data storage 44 to determine the health status of the host server devices 14(1)-14(n). FIGS. 5A-5C shows the rules stored in the health check data storage 44 in association with the host server devices 14(1)-14(n) may include for example, rules stored in operating system check rules 510. The operating system check rules 510 may include, by way of example, raise error if system uptime is more than 90 days threshold, raise error if current CPU usage is more than 75%, raise warning if system uptime is more than 90 days, although any other types of rules may be included in association with determining the health of the host server devices 14(1)-14(n).

The switch check module 36 in this example is utilized to check the heath status of the fabric components which include the switch devices 20a(1)-20a(n) and 20b(1)-20b(n) in the SANs 13(1)-13(n). The fabric components may include switches, routers or any other network devices utilized as part of a fabric of the SANs 13(1)-13(n). The switch check module 36 utilizes various rules stored in the health check data storage 44 to determine the health status of the switch devices 20a(1)-20a(n) and 20b(1)-20b(n). FIGS. 5A-5C shows the rules stored in the health check data storage 44 in association with the switch devices 20a(1)-20a(n) and 20b(1)-20b(n) and may include, by way of example, rules stored in hardware check rules 530. The hardware check rules 530 may include, for example, report the errpt permanent errors for each HBA/disks, report warning if all the failed disks from single HBA, report error if the disk path failures from multiple HBA, although any other types of rules may be included in association with determining the health of the switch devices 20a(1)-20a(n) and 20b(1)-20b(n).

The array check module 38 in this example is utilized to check the health status of the storage components 15a(1)-15a(n) and 15b(1)-15b(n) included in the SANs 13(1)-13(n). The host check module 34 utilizes various rules stored in the health check data storage 44 to determine the health status of the storage components 15a(1)-15a(n) and 15b(1)-15b(n). The storage components 15a(1)-15a(n) and 15b(1)-15b(n) may further include storage arrays 16a(1)-16a(n) and 16b(1)-16b(n). The array check module 38 utilizes various rules stored in the health check data storage 44 to determine the health status of the storage arrays 16a(1)-16a(n) and 16b(1)-16b(n). FIGS. 5A-5C shows the rules stored in the health check data storage 44 in association with the storage arrays 16a(1)-16a(n) and 16b(1)-16b(n) and may include by way of example, rules stored in storage check rules 550. The storage check rules 550 may include, raise error if /var/gtitools/bin/x3_srdf_check shows PROBLEM, raise error if /var/gti-tools/bin/x3_hds_rep_check shows PROBLEM, raise error if /var/gtitools/bin/x3_san_mpchk_mpath shows PROBLEM, although any other types of rules may be included in association with determining the health of the switch devices 20a(1)-20a(n) and 20b(1)-20b(n) and further determining the health of any storage component in the SANs 13(1)-13(n).

The database check module 40 in this example is utilized to check the health status of the server devices 17(1)-17(n) included in the SANs 13(1)-13(n). Further, the database check module 40 utilizes the database check module 40 to check the health status of the databases 18(1)-18(n) included in the server devices 17(1)-17(n). The database check module 40 utilizes various rules stored in the health check data storage 44 to determine the health status of the databases 18(1)-18(n) included in the server devices 17(1)-17(n). The rules stored in the health check data storage 44 may include for example, rules stored in the database check rules. The database check rules may include checking usage percentage for UNDO tablespace usage, temporary tablespace usage, flashback recovery area usage and ASM diskgroup space. Further, when the usage percentage is determined to be 90% utilization then an AMBER colored notification is to be displayed, and when the usage percentage is determined to be 95% utilization then a RED colored notification is to be displayed. Although any other types of rules may be included in association with determining the health of the databases 18(1)-18(n) included in the server devices 17(1)-17(n).

The job execution module 42 in this example executes the health check jobs in association with the code execution module 32, the host check module 32, the switch check module 34, the array check module 38, the database check module 40 and the health check data storage 44. In this example, the job execution module 42 may include, software applications, by of example, one or more daemons that run by specific storage functional IDs (FIDs) with read-only access to switches the 20a(1)-20b(n) and storage components 15a(1)-15a(n) and 15b(1)-15b(n). The daemons may further poll the health check data storage 44 periodically and execute any job submitted by the system user. Further, in order to avoid excessive loading, the daemons may execute jobs sequentially. In another example, a daemon may operate on the entire SAN framework including the host components, fabric components and the storage components.

The health check data storage 44 stores health check rules associated with determining the health of the server devices 17(1)-17(n) and the SANs 13(1)-13(n). With reference to FIGS. 5A-5C, the health check data storage 44 stores health check rules including operating system check rules 510, file system check rules 520, hardware check rules 530, network check rules 540, storage check rules 550, cluster check rules 560 and VIOS check rules 570, utilized for determining health of individual components within the SANs 13(1)-13(n), which includes, a host server device 14(1)-14(n), fabric components 20a(1)-20a(n) and 20b(1)-20b(n) and storage components 15a(1)-15a(n) and 15b(1)-15b(n). The storage components 15a(1)-15a(n) and 15b(1)-15b(n) may further include storage arrays 16a(1)-16a(n) and 16b(1)-16b(n). Further, the health check data storage 44 stores database rules 500 associated with determining health of the hosts databases 18(1)-18(n) with in each of the server devices 17(1)-17(n). In this example, further the health check data storage 44 stores the health check jobs submitted by the system users to be executed. Although any other types of rules may be included in association with determining the health of the network devices in the network environment 1. The health check data storage 44 also stores information about the each of the network component devices associated with their host identifier. The host device associated with the identifier includes and/or utilizes each of the network component devices as part of the communication. Further, the network component device may include, serial ports, cables, virtual servers, hardware connections, physical connections, router, switches, servers, databases connected in a network. The health check data storage 44 stores information on the health check job types associated with each of the network component devices. The network component device may include, the server devices 17(1)-17(n) hosting the databases 18(1)-18(n) and the SANs 13(1)-13(n) including the host server devices 14(1)-14(n), fabric components 20a(1)-20a(n) and 20b(1)-20b(n) and storage components 15a(1)-15a(n) and 15b(1)-15b(n). Although, any other type of network device who's health is to be determined may also be included. The health check data storage 44 includes a historical database that includes a list of recently executed health check job types and timestamps for the execution times of previous health check job types. The health check data storage 44 includes information associating the types of network parameters to be monitored based on the health check type.

The communication interface 28 of the health check device 12 operatively couples and communicates between the health check device 12, the SANs 13(1)-13(n), the server devices 17(1)-17(n), and/or the client devices 11(1)-11(n), which are all coupled together by the communication network(s) 10 and/or direct connections, although other types and/or numbers of communication networks or systems with other types and/or numbers of connections and/or configurations to other devices and/or elements can also be used.

By way of example only, the communication network(s) 10 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 in this example can employ any suitable interface mechanisms and network communication technologies including, for example, tele-traffic in any suitable form (e.G., voice, modem, and the like), Public Switched Telephone Network (PSTNs), Ethernet-based Packet Data Networks (PDNs), combinations thereof, and the like.

The health check device 12 can be a standalone device or integrated with one or more other devices or apparatuses. In one particular example, the health check device 12 can include or be hosted by one of the server devices 17(1)-17(n) or the SANs 13(1)-13(n), and other arrangements are also possible. Moreover, one or more of the devices of the health check device 12 can be in a same or a different communication network including one or more public, private, or cloud networks, for example.

The SANs 13(1)-13(n) in this example are any type of computing device capable of hosting host server devices 14(1)-14(n), fabric components 20a(1)-20a(n) and 20b(1)-20b(n) and storage components 16a(1)-16a(n), 16b(1)-16b(n), 15a(1)-15a(n) and 15b(1)-15b(n). The fabric components 20a(1)-20a(n) and 20b(1)-20b(n) may include switches and routers although other numbers and/or types of network devices could also be used. The storage components 15a(1)-15a(n) and 15b(1)-15b(n) include storage arrays 16a(1)-16a(n) and 16b(1)-16b(n). the storage arrays 16a(1)-16a(n) and 16b(1)-16b(n) may include storage frames although other numbers and/or types of network storage devices could also be used. Accordingly, each of the SANs 13(1)-13(n) includes host server devices 14(1)-14(n), fabric components 20a(1)-20a(n) and 20b(1)-20b(n) and storage components 16a(1)-16a(n), 16b(1)-16b(n), 15a(1)-15a(n) and 15b(1)-15b(n), memory, and a communication interface, which are coupled together by a bus or other communication link, although other numbers and/or types of network devices could be used.

The host server devices 14(1)-14(n) in the SANs 13(1)-13(n) are monitored by the health check device 12 to determine the health of the server devices 17(1)-17(n). Further, the request would be to determine the health of the databases 18(1)-18(n) of the server devices 17(1)-17(n). In this example, the job execution module 42 of the health check device 12 receives health check job execution requests from the system user sent via a user interface. The job execution module 42 upon receiving the health check job monitors the network component devices associated with the health check job. In this example, the job execution module 42 identifies the host server device 14(1) as the network component device to be monitored. The job execution module 42 then determines which module is to be utilized for checking the health of the identified network device component. In this example, the job execution module 42 identifies the host check module 32 to be associated with determining the health of the identified host server device 14(1), as host check module 32 is dedicated to check the health of each of the host server devices 14(1)-14(n) in the network environment 1. Further, the host check module 32 determines the health of the host server device 14(1) and further determines which type of alert notification is to be generated based on the rules associated with the host server device 14(1) determination stored in the health check data storage 44. In this example, the operating system check rules 510 stored in the health check data storage 44 are utilized to determine the type of alert notification to be generated in association with the health of the host server device 14(a). After determining the type of alert notification associated with the health of the host server device 14(1) the host check module 32 displays the results of the determination to the client device via the user interface module 46. Although the other forms of rules and methods may also be used to determine the health of the host server devices 14(1)-14(n).

The fabric components 20a(1)-20a(n) and 20b(1)-20b(n) in the SANs 13(1)-13(n) are monitored by the health check device 12 to determine the health of the switches 20a(1)-20a(n) and 20b(1)-20b(n). The monitoring and the determination of the health of the switches 20a(1)-20a(n) and 20b(1)-20b(n) is based on identifying the switch check module 36 and is similar to the monitoring and the determination of the health of the host server devices 14(1)-14(n) described above. In this example, the operating system check rules 530 and cluster check rules 560 stored in the health check data storage 44 may be utilized to determine the type of alert notification to be generated in association with the health of the database 18(1). Although the other forms of rules and methods may also be used to determine the health of the fabric components 20a(1)-20a(n) and 20b(1)-20b(n).

The storage components 16a(1)-16a(n), 16b(1)-16b(n), 15a(1)-15a(n) and 15b(1)-15b(n) in the SANs 13(1)-13(n) are monitored by the health check device 12 to determine the health of the storage components 16a(1)-16a(n), 16b(1)-16b(n), 15a(1)-15a(n) and 15b(1)-15b(n). The monitoring and the determination of the health of the storage components 16a(1)-16a(n), 16b(1)-16b(n), 15a(1)-15a(n) and 15b(1)-15b(n) is based on identifying the array check module 38 and is similar to the monitoring and the determination of the health of the host server devices 14(1)-14(n) described above. In this example, the storage check rules 550 stored in the health check data storage 44 may be utilized to determine the type of alert notification to be generated in association with the health of the database 18(1). Although the other forms of rules and methods may also be used to determine the health of the fabric components storage components 16a(1)-16a(n), 16b(1)-16b(n), 15a(1)-15a(n) and 15b(1)-15b(n).

The server devices 17(1)-17(n) in this example are any type of computing device capable of hosting the databases 18(1)-18(n). Accordingly, each of the server devices 17(1)-17(n) includes one or more databases 18(1)-18(n), memory, and a communication interface, which are coupled together by a bus or other communication link, although other numbers and/or types of network devices could be used.

The server devices 17(1)-17(n) in the SANs 13(1)-13(n) are monitored by the health check device 12 to determine the health of the server devices 17(1)-17(n) and the databases 18(1)-18(n) within them. In this example, the job execution module 42 of the health check device 12 receives health check job execution requests from the system user sent via a user interface. The job execution module 42 upon receiving the health check job monitors the network component devices associated with the health check job. In this example, the job execution module 42 monitors the databases 18(1)-18(n) as the network component device to be monitored. The job execution module 42 then determines which module is to be utilized for checking the health of the identified network device component. In this example, the health check device 12 identifies the database 18(1) of the server device 17(1) as the device who's health is to be determined based on the request. In this example, the job execution module 42 identifies the database check module 40 to be associated with determining the health of the identified database 18(1), as database check module 40 is dedicated to check the health of each of the databases 18(1)-18(n) in the network environment 1. Further, the database check module 40 determines the health of the database 18(1) and further determines which type of alert notification is to be generated based on the rules associated with the database 18(1) determination stored in the health check data storage 44. In this example, the operating system check rules 500 stored in the health check data storage 44 are utilized to determine the type of alert notification to be generated in association with the health of the database 18(1). After determining the type of alert notification associated with the health of the database 18(1) the host check module 32 displays the results of the determination to the client device via the user interface module 46. Although the other forms of rules and methods may also be used to determine the health of the server devices 17(1)-17(n).

The client devices 11(1)-11(n) in this example include any type of computing device that can host applications (e.g., application servers) that issue health check requests to the health check device 12 that performs health checks of the server devices 17(1)-17(n) and the SANs 13(1)-13(n) based on the requests. Each of the client devices 11(1)-11(n) in this example includes a processor, a memory, and a communication interface, which are coupled together by a bus or other communication link, although other numbers and/or types of network devices could be used.

Although the exemplary network environment 1 with the health check device 12, SANs 13(1)-13(n), server devices 14(1)-14(n), client devices 11(1)-11(n), and communication network(s) 10 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 1, such as the health check device 12, SANs 13(1)-13(n), server devices 14(1)-14(n) and client devices 11(1)-11(n), for example, may be configured to operate as virtual instances on the same physical machine. In other words, one or more of the health check device 12, SANs 13(1)-13(n), server devices 14(1)-14(n) or client devices 11(1)-11(n) may operate on the same physical device rather than as separate devices communicating through communication network(s) 10. Additionally, there may be more or fewer health check devices, SANs, server devices, or client devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
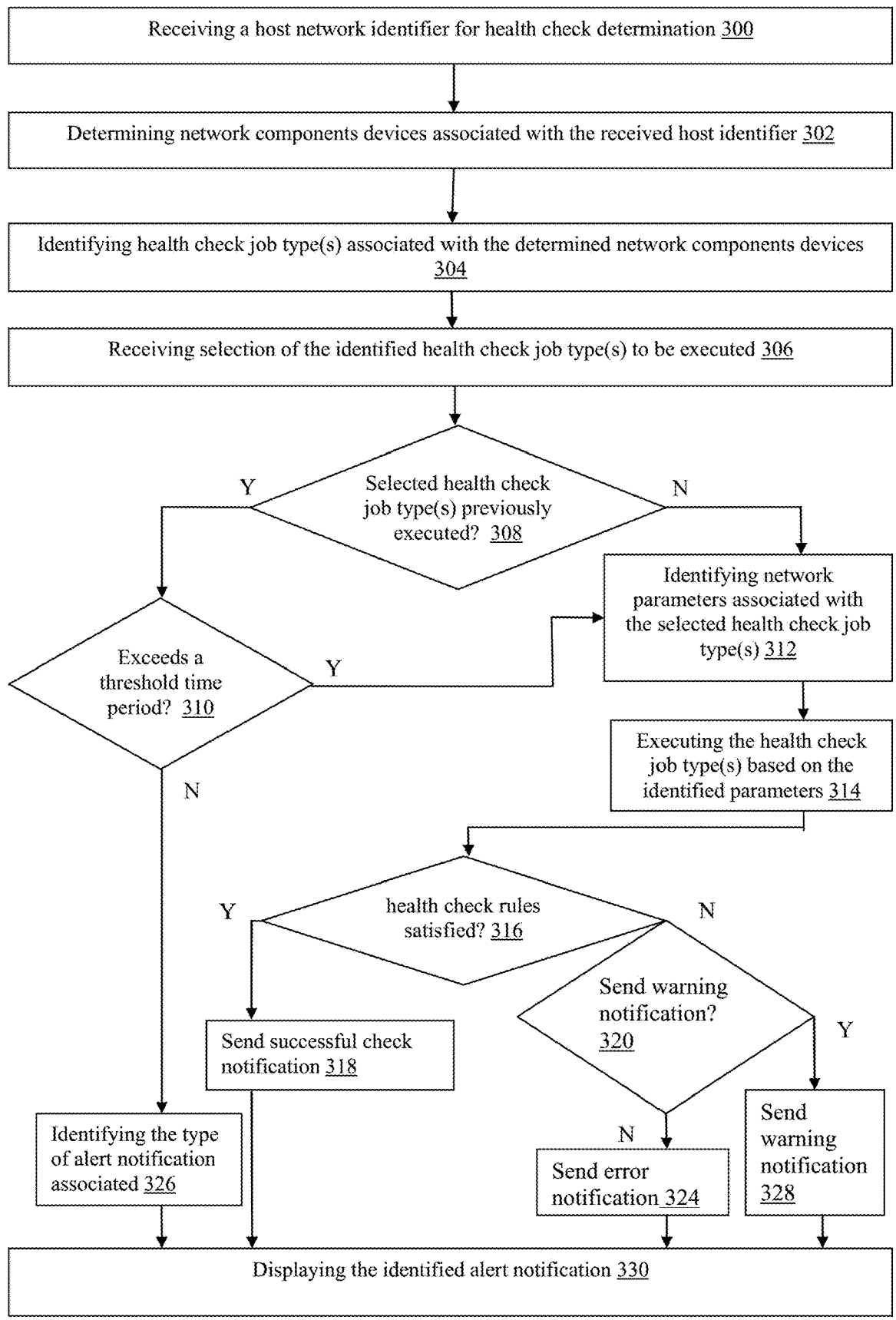
FIG. 3 is a flowchart of an exemplary method for initializing the exemplary health check device of FIG. 1.

An exemplary method of improved health check determination across the SANs 13(1)-13(n) and server devices 17(1)-17(n) will now be described with reference to FIGS. 1-5C. Referring more specifically to FIG. 3, an exemplary method for initializing the health check device 12 and network connectivity health check determination is illustrated.

Figure 4A:
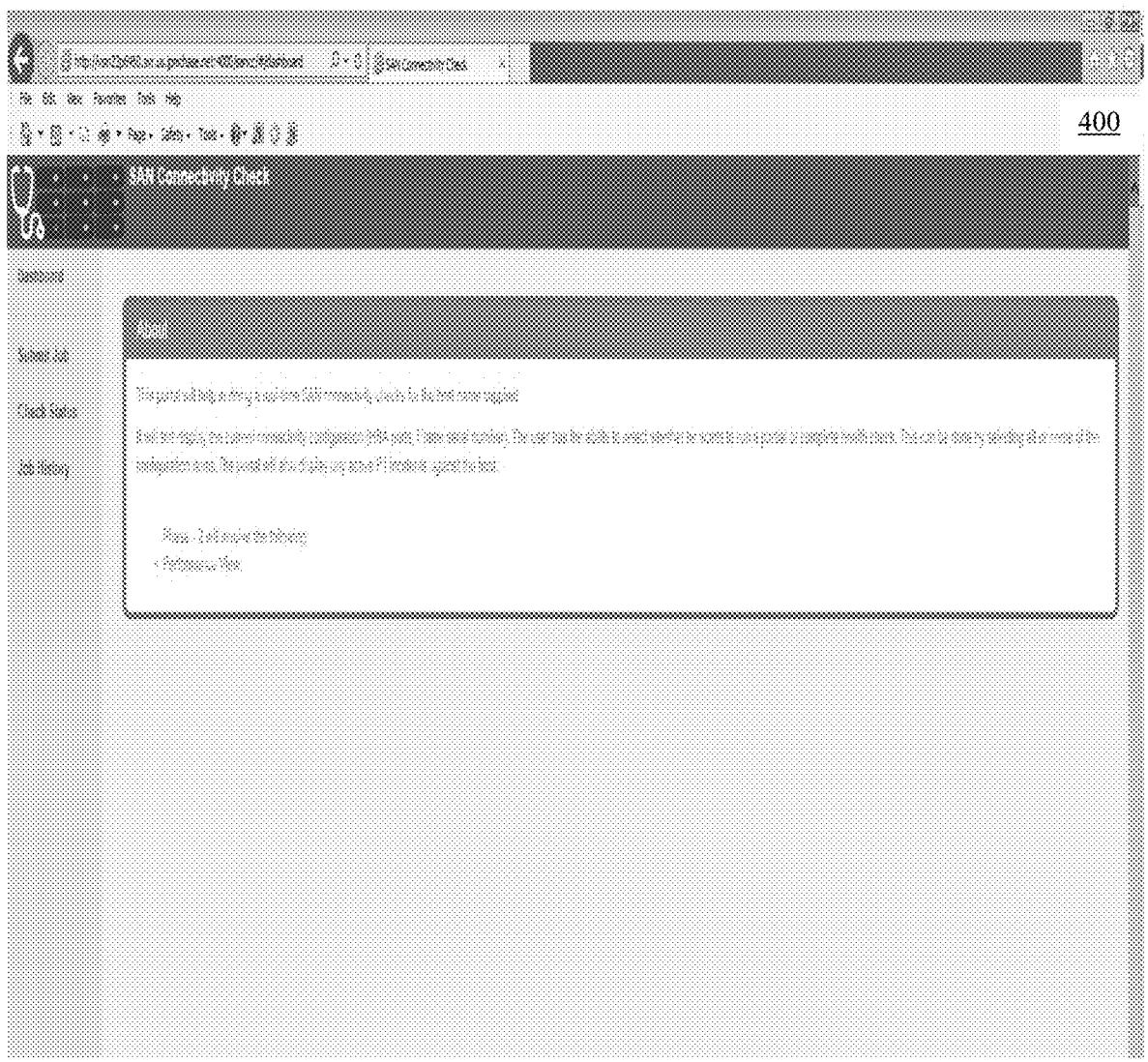
FIG. 4A is a screen shot illustrating an introductory health check user interface in accordance with an embodiment of the invention.
Figure 4B:
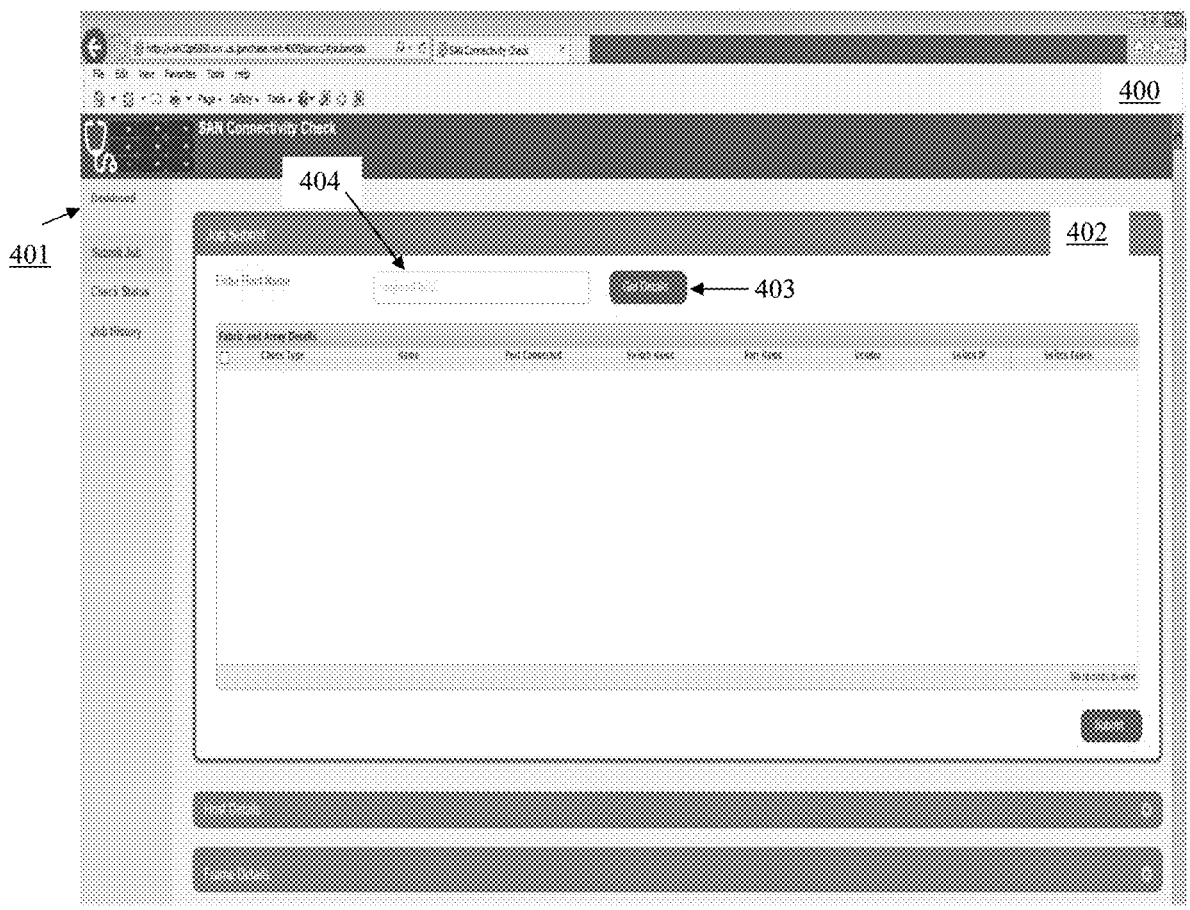
FIG. 4B is a screen shot illustrating a user interface for submission of a health check job in accordance with an embodiment of the invention.
Figure 4C:
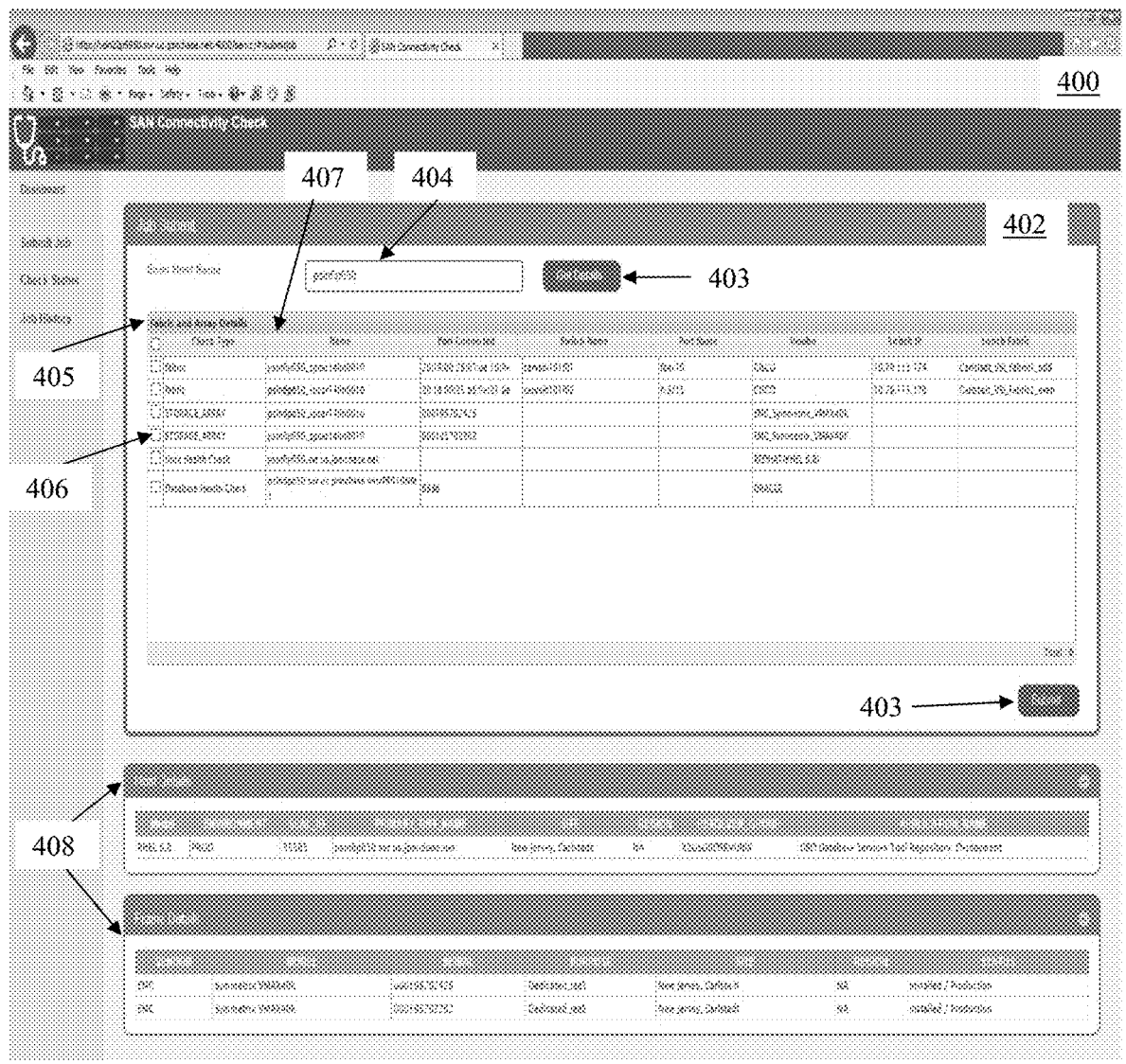
FIG. 4C is a screen shot illustrating a user interface for selection of health check job generated upon submission of the health check job in accordance with an embodiment of the invention.

In step 300 in this example, the health check device 12 receives a host identifier for health check determination. The health check device 12 receives the host identifier as an input from a user or a system administrator of a network who would like to determine the health of a number of network devices connected in the network in real time. With reference to FIGS. 4A-4C a user interface is displayed for a user to enter the host identifier. The user interface in this example, is a web page 400 accessed over the communicate network and displayed over a web browser. The web page 400 in FIG. 4A displays a welcome prompt to the user, under the "About" title. The prompt displays a message providing information on how a user may access the webpage to determine the health of a number of network devices connected in the network in real time. FIG. 4B shows the user interface 400 including "Dashboard" 401 which includes three options "Submit Job", "Check Status" and "Job History" for the user to select from. In FIG. 4B the user selects the "Submit Job" option on the user interface, and upon selection the user interface 400 displays a "Job Submit" page 402 with an "Enter host name" box 404. FIG. 4C shows the user enters the host name or host identifier 404 in the box 404 and clicks on the "Get Details" button 403 to submit the host identifier and the health check device 12 receives the entered host identifier for health check determination. The submission of the host identifier generates a request for health check determination which is sent to the health check device 12, this generated request is also referred to as a job request.

In step 302, the health check device 12 determines network component devices associated with the received host identifier. Upon receiving the job request, the health check device 12 accesses the health check data storage 44 to determine all of the network devices associated with the received host identifier. The health check data storage 44 stores information about the each of the network component devices associated with their host identifier. Further the health check data storage 44 also stores information on the health check job types associated with each of the network component devices. The network component device may include, the server devices 17(1)-17(n) hosting the databases 18(1)-18(n) and the SANs 13(1)-13(n) including the host server devices 14(1)-14(n), fabric components 20a(1)-20a(n) and 20b(1)-20b(n) and storage components 15a(1)-15a(n) and 15b(1)-15b(n). Although, any other type of network device whose health is to be determined may also be included. FIG. 4C shows upon the user enters the host name or host identifier 404 in the box 404 and clicks on the "Get Details" button 403 and submits the host identifier, the interface 405 "Fabric and Array Details" is displayed. The interface 405 shows columns "Check Type", "Name", "Ports Connected", "Switch Name", "Port Name", "Vendor", "Switch IP" and "Switch Fabric". The column "Name" displays the device identifier names for the network component devices associated with the received device identifier. This column displays the list of network component devices associated with the receive host identifier 404 and is determined by the health check device 12 by accessing the health check data storage 44. Further FIG. 4C shows the "Host Details" tab and the "Frame Details" tab 408. The "Host Details" tab displays information of the host server identified in the list of determined network component devices and the "Frame Details" tab displays information of the storage arrays identified in the list of determined network component devices.

In step 304, the health check device 12 identifies health check job types associated with the determined network component devices. Further the health check data storage 44 stores information on the health check job types associated with each of the network component devices. The health check device 12 utilizes the data storage 44 to determine the health check job type associated with each of the network component devices. FIG. 4C shows the column "Check Type" displays a list of the type of health check jobs to be performed on each of the device identifier names for the network component devices. Further, each of the listed health check job types has a check box 406 which is displayed next to it. The user may select the individual check boxes 406 based on the type of health check they would like to perform.

In step 306, the health check device 12 receives a selection of the identified health check job type(s) to be executed. FIG. 4C shows the column "Check Type" displays a list of the type of health check jobs to be performed on each of the device identifier names for the network component devices. Further, each of the listed health check job types has a check box 406 which is displayed next to it. The user may select the individual check boxes 406 based on the type of health check they would like to execute. Upon the user selects the health check job types to be executed, the user clicks on the "submit" button 403, to submit the selected health check job types for execution.

In step 308, the health check device 12, determines whether the selected health check job types has been previously executed. Upon the user selecting the health check job types to be executed by clicking on the "submit" button 403 in this example, to submit the selected health check job types for execution in step 306, the health check device 12 determines whether the selected health check job types have been executed by the same user or another user recently. The health check data storage 44 includes a historical database that includes a list of recently executed health check job types and timestamps for the execution times of previous health check job types. The recently executed health check job type includes all the health check job types executed in the last 15 minutes. Upon submission of the selected health check job types, the health check device 12 accesses the health check data storage 44 to determine if the selected health check job type was previously executed in the last, by way of example, 15 minutes. Although any another time period may be included. When there is a determination that the selected health check job type was previously executed then the method takes the YES branch and the method proceeds to step 310. In another example, the health check device 12 determined whether the selected health check job types has been previously executed by accessing the health check data storage 44 to determine if any of the identified active health checks job types are currently being executed for the same host network identifier based a previous request. Upon determining that any of the identified active health checks job types are currently being executed then the health check device 12 waits for the previous execution to be completed. Upon the health check device 12 determines that the previous execution has been completed, then the health check device 12 proceeds to step 312 to re-run the execution of the selected health check job types.

In step 310, the health check device 12 accesses the health check data storage 44 to compare the timestamp with the threshold execution time period to determine if the timestamp associated with the selected health check job type has exceeded a predefined threshold execution time period, by way of example, 15 minutes, although any another time period may be included. The health check device 12 determines whether the selected health check job type has been executed within, in this example, the last 15 minutes, although again any another time period may be included. If the health check device 12 determines that selected health check job types have not been executed within the last 15 minutes and thus exceed the threshold execution time period, then method takes the YES branch to step 312.

If back in step 310, the health check device 12 determines that the selected health check job types have been executed within the last 15 minutes and thus do not exceed the threshold execution time period of 15 minutes, then method takes the NO branch to step 326. In step 326, the health check device 12 identifies the type of alert notification associated with the selected health check type. The health check data storage 44 along with the list of previously executed health check types also stores the type of alert notification that was associated with its previous execution. In this step, the health check device 12 accesses the health check data storage 44 and associates the previous type of alert notification as its current alert notification state and the method proceeds to step 330.

If in step 308, when the health check device 12 accessed the historical database that included a list of recently executed health check job types included in the health check data storage 44 and determined that the selected health check job type was not previously executed in the last, by way of example, 15 minutes, then the method takes the NO branch and to step 312.

Figure 4D:
FIG. 4D is a screen shot screen illustrating showing results for a selected health check job submission in accordance with an embodiment of the invention.
Figure 4E:
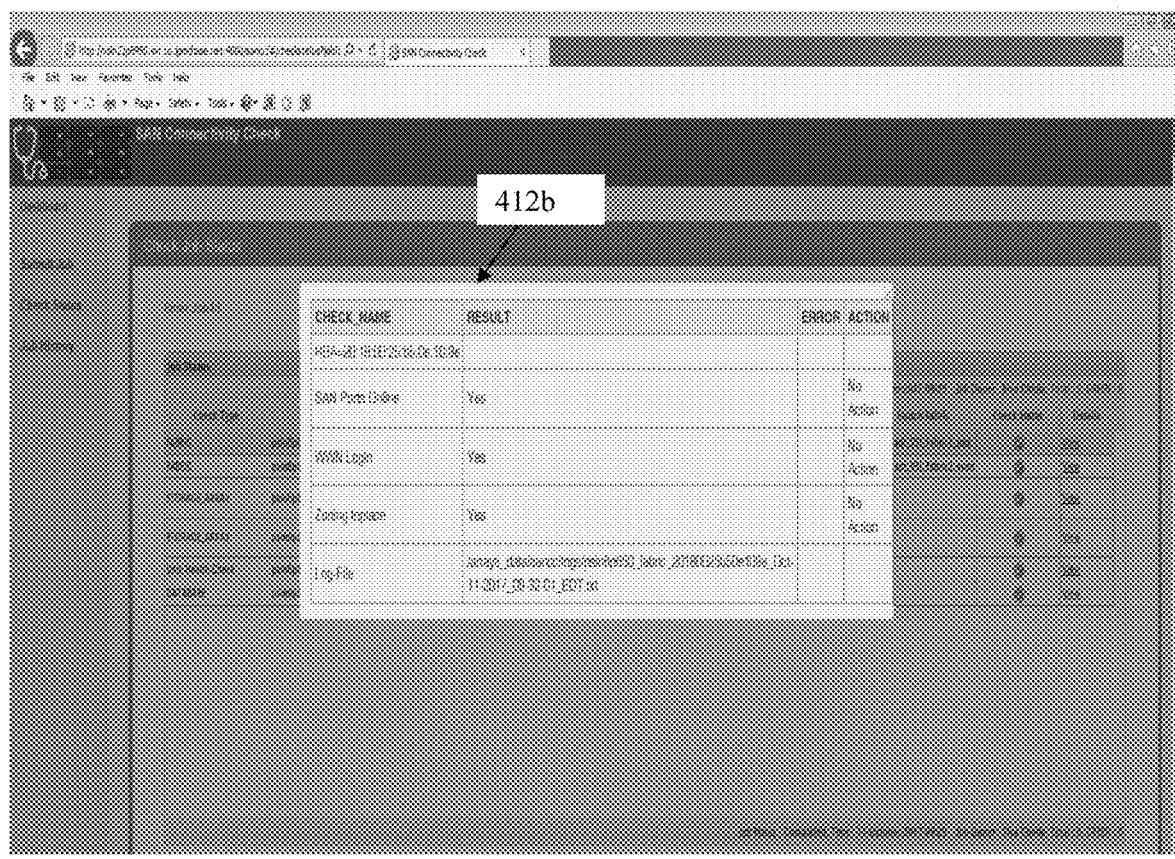
FIGS. 4E-F is a screen shot illustrating a user interface showing further results of a health check job submission in accordance with an embodiment of the invention.

In step 312, the health check device 12 identifies network parameters associated with the selected health check job types. With reference to FIG. 4C, the user selects all of the check boxes 406 associated with the health check types and clicks on submit 403. The health check device 12 determines the types of network parameters associated with the selected heath check type based on accessing the information stored in the health check data storage 44. The health check data storage 44 includes information associating the types of network parameters to be monitored based on the health check type. Upon clicking on the submit button 403 the user is presented with FIG. 4D. In FIG. 4D the user is presented with the results of the health check. When the user clicks on the first result 412*a* associated with "FABRIC" check type, the user is presented with FIG. 4E. The FIG. 4E shows 412*b* the different network parameters utilized by the health check device 12 to perform the health check. In this example, for the health check job type 412*a*, the health check device 12 identifies the network parameters of "SAN Ports Online", "WWN Login", "Zoning Inplace". In another example, when the user clicks on the second result 413*a* associated with "STORAGE ARRAY" check type, the user is presented with FIG. 4G. The FIG. 4E shows 413*b* the different network parameters utilized by the health check device 12 to perform the health check. In this example, for the health check job type 413*a*, the health check device 12 identifies the network parameters of "HOST WWNs Logins", "Even HBAs(1)", "Odd HBAs(1)", "All Devices Read_Write", "Hardware Operating Normal".

In step 314, the health check device 12 executes the health check job type based on the identified network parameters. Based on the network parameters identified in the step 312, the health check device 12 executes the health check type by monitoring each of the identified parameters. By way of example, with reference to FIGS. 4C-4D, when the user selects check box 406 associated with the health check type "FABRIC" 412*a* and clicks on submit 403. The health check device 12 executes the health check type "FABRIC" 412*a* by monitoring the network parameters of "SAN Ports Online", "WWN Login", "Zoning Inplace" that are identified as to be associated with the health check type "FABRIC" 412*a* in the step 312.

In step 316, the health check device 12 determines whether health check rules are satisfied based on the execution of the health check job types by monitoring the identified network parameters. By way of example, with reference to FIGS. 4C-4E, the health check device 12 executes the health check type "FABRIC" 412*a* by monitoring the network parameters of "SAN Ports Online", "WWN Login", "Zoning Inplace" based on the rules associated with each of these network parameters. In this example, when the SAN ports associated with the FABRIC being monitored are up and running or functioning then the monitored network parameter of "SAN Ports Online" gives a result of YES. When the world wide name "WWN Login" associated with the FABRIC being monitored is correct then the monitored network parameter of "WWN Login" gives a result of YES. When the world wide name "Zoning Inplace" associated with the FABRIC being monitored is in place then the monitored network parameter of "Zoning Inplace" gives a result of YES. The rules associated with the health check type for the FABRIC has a condition of only when all of the network parameter results are a YES, then the alert notification to be provided is GREEN and the method proceeds. However, if any one of the network parameter results is a NO, then the alert notification to be provided is RED.

Figure 4F:
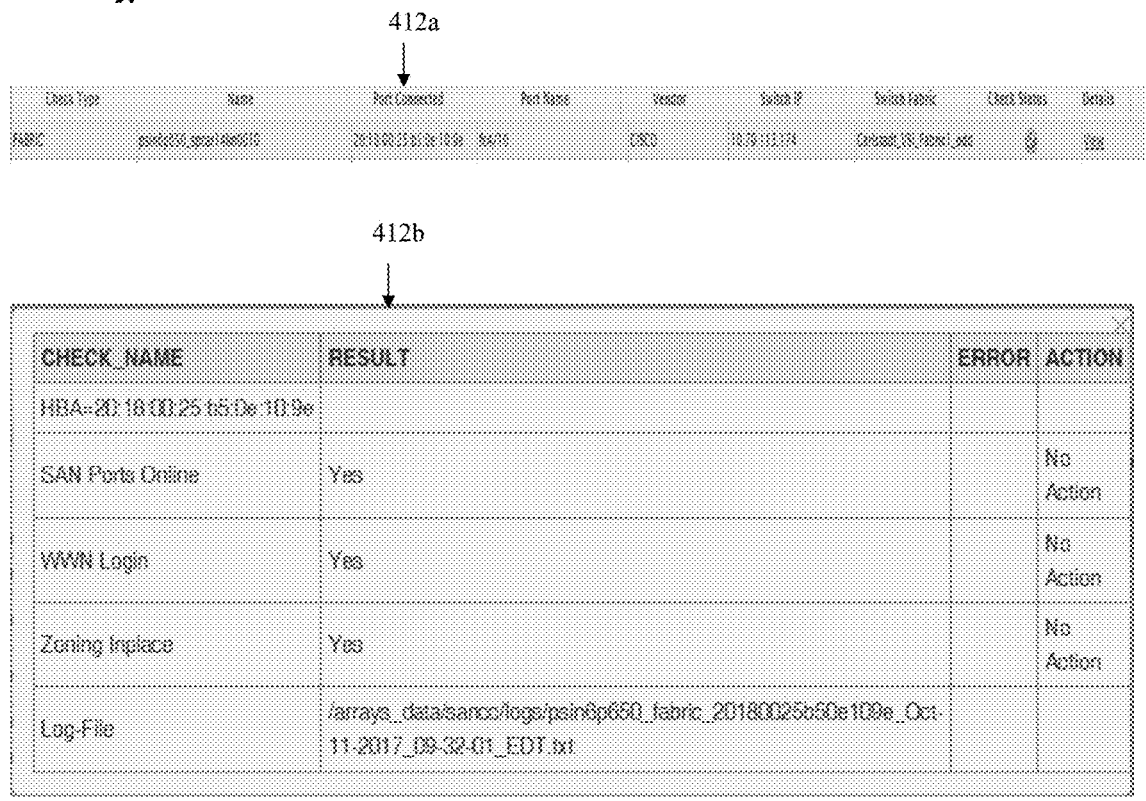
Figure 4G:
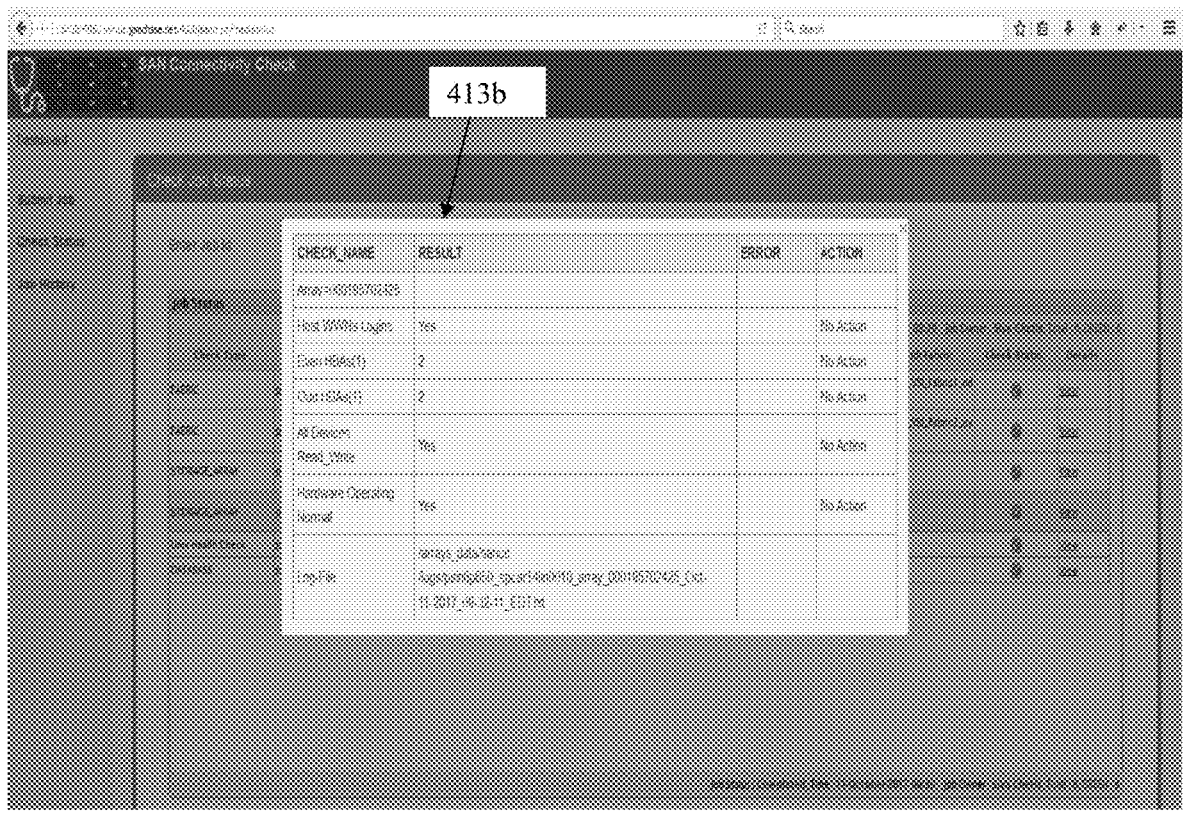
Figure 4I:
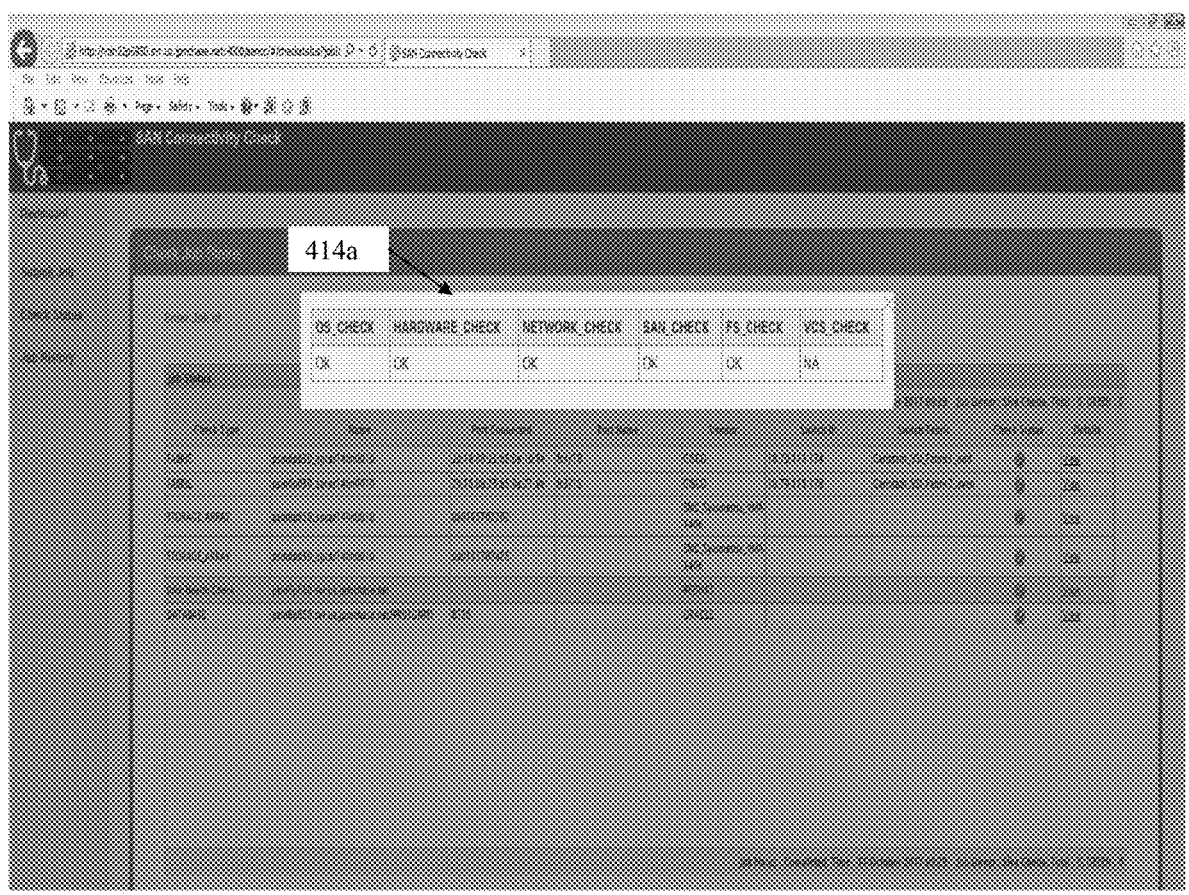
FIG. 4I is a screen shot illustrating a user interface showing further results of a health check job submission in accordance with an embodiment of the invention.

In above example, the health check device 12 determines the health check rules are satisfied with reference to FIGS. 4D-F, as 412*a* and 412*b* shows that the all of the network parameter results are a YES and the alert notification provided is GREEN. In this scenario when the health check device 12 determines the health check rules are satisfied hence the method proceeds to step 318. Further, FIGS. 4D and 4I shows the results for the health check type of 414*a* with all the network parameters of "OS-CHECK", "HARDWARE_CHECK", "NETWORK_CHECK", "SAN_CHECK", "FS_CHECK" and "VCS_CHECK". Further, FIG. 4I with all the network parameters result to be OK, which represent a successful check to result in the method proceeding to step 318.

If in step 316 the health check device 12 determines the health check rules are not satisfied with reference to FIG. 4F, and any one of the network parameter results is a NO, then the alert notification provided is RED. In this scenario the health check device 12 determines the health check rules are not satisfied hence the method proceeds to step 320.

In another example, back in step 316, health check device 12 determines whether health check rules are satisfied based on the execution of the health check job types by monitoring the identified network parameters. With reference to FIGS. 4D, 4G and 4H. The health check device 12 executes the health check type "STORAGE_ARRAY" 413*a* by monitoring the network parameters of "Host WWNs Logins", "Even HBAs(1)", "Odd HBAs(1)", "ALL Devices Read_Write" and "Hardware Operating Normal" based on the rules associated with each of these network parameters. In this example, when the Host WWNs Logins associated with the STORAGE_ARRAY being monitored are correct functioning then the monitored network parameter of "Host WWNs Logins" gives a result of YES. When all devices associated with the STORAGE_ARRAY being monitored are able to read and write then the monitored network parameter of "ALL Devices Read_Write" gives a result of YES. When all the hardware devices associated with the STORAGE_ARRAY being monitored are operating normally then the monitored network parameter of "Hardware Operating Normal" gives a result of YES. Further, for the number of even host bus adapters count and odd host bus adapter count is made and 413*b* shows the "Even HBAs(1)" count and "Odd HBAs(1)" count is determined to be 2.

In above example, the health check device 12 determines the health check rules are satisfied with reference to FIGS. 4D, 4G and 4H, when all the network parameter results are reported as YES and the HBA count is matched on both sides (even & odd), then the alert notification is GREEN. In this scenario the health check device 12 determines the health check rules are satisfied hence the method proceeds to step 318.

Back in step 316, when the health check device 12 determines the health check rules are not satisfied with reference to FIGS. 4D, 4G and 4H, when all the network parameter results are reported as YES and the HBA count is not matched on both sides (even & odd), then the alert notification is RED. In another scenario, when all the network parameter results are reported as YES and the either of HBA count (even & odd) is zero, then the alert notification is AMBER. In yet another scenario when any one of the network parameter results is reported as NO then the alert notification is RED. Then the health check device 12 determines the health check rules are not satisfied hence the method proceeds to step 320.

In step 320, the health check device 12 determines if a warning notification is to be sent based on the step 316. With reference to above example and the FIGS. 4D, 4G and 4H, when all the network parameter results are reported as YES and the either of HBA count (even & odd) is zero, then the alert notification is AMBER. Then the health check device 12 determines that an AMBER colored alert notification that represents a warning condition is to be sent and hence the method proceeds to step 328.

Back in step 320, the health check device 12 determines if a warning notification is to be sent based on the step 316. With reference to above example and the FIGS. 4D, 4G and 4H, when all the network parameter results are reported as YES and the HBA count is not matched on both sides (even & odd), then the alert notification is RED. In yet another scenario when any one of the network parameter results is reported as NO then the alert notification is RED. Then the health check device 12 determines that a RED colored alert notification that represents an error condition is to be sent and hence the method proceeds to step 324.

In step 330, the health check device 12 displays the type of alert notification determined in the previous steps where the method reaches from. When the method reaches the step 330 from 318, then the health check device 12 displays a GREEN colored alert notification representing a successful health check with no concerns to the device component health. When the method reaches the step 330 from 324, then the health check device 12 displays a RED colored alert notification representing a failure in health check and razing issues and/or concerns to the device component health. When the method reaches the step 330 from 328, then the health check device 12 displays an AMBER colored alert notification representing a unsuccessful health check and razing issues and/or concerns that need attention to avoid failure of the device component. Also, when the method reaches the step 330 from the step 326, then the health check device 12 displays the last identified alert notification associated with the health check type.

In another example, the user interface 400 provides the users the option to identify historical health check incident records associated with the determined network component devices stored in the health check data storage 44. The historical health check incident records may include information on the previous and/or active types of network incidents associated with the determined network component devices. The types of network incidents may include, by way of example, network failure, server overload, server failure, hardware failure. Although, any other types of network incidents may also be included. The user interface 400 may include options on the user interface for selection by the user, to provide users with previous or active alert notifications associated with the determined network component devices. The user may selection an option, by way of example, by clicking a button, although any other forms of selection may be included. Upon the user selection of the option, the health check device 12 accesses the health check data storage 44 to identify historical health check incident records associated with the determined network component devices and displays a list of all the past and/or current alert notifications for the identified health check types of step 304 associated with the determined network component devices of step 302. Further, upon the user selection of the option, the health check device 12 also provides change of record information associated with the determined network component devices of step 302 for active, scheduled and past changes to the types of network incidents based on accessing the historical health check incident records stored in the health check data storage 44.

With this technology, optimized process of determining health status of multiple network devices connected over a network efficiently is provided. This technology facilitates monitoring network system issues associated with network devices and provide warnings to the system administrator when network issues and/or network failures are identified. Accordingly, this technology reduces the effort for administrators by providing multiple system checks for multiple network devices across a network in a single view.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for improved network connectivity health check implemented by one or more health check devices, the method comprising:
   determining a network component device associated with a received host network identifier;
   identifying a plurality of available health check job types associated with the determined network component device,
   receiving a plurality of one or more selections among the identified health check job types for execution;
   assigning, simultaneously to the determined network component device, a plurality of health jobs types that are selected for execution;
   executing the selected health check job types;
   determining when one or more health check rules are satisfied based on the execution of the health check job types;
   identifying one of one or more alert notifications when the determination indicates that the one or more health check rules are satisfied;
   displaying the one or more alert notifications;
   determining when the selected health check job types have been previously executed;
   identifying one or more network parameters when the determination indicates that the selected job types have been previously executed;
   determining a timestamp associated with the selected health check job types when the determination indicates that the selected health check job types have been previously executed;
   determining when the timestamp associated with the selected health check job types exceeds a threshold execution time period value; and
   displaying the one or more alert notifications when the determination indicates that the timestamp associated with the selected health check job types exceed the threshold execution time period.

2. The method of claim 1, further comprising:
   identifying one or more network parameters based on the execution of the health check job types; and
   determining when the one or more health check rules are satisfied based on the identified one or more network parameters.

3. The method of claim 1, further comprising:
   identifying another one of the one or more alert notifications when the determination indicates that the one or more health check rules are not satisfied; and
   displaying the another one of the one or more alert notifications.

4. The method of claim 1, further comprising:
   displaying, for selection, a list of the plurality of available health check job types,
   wherein more than one health check job type is selected for execution from the list of the plurality of available health check job types.

5. The method of claim 1, wherein the plurality of the selections among the identified health check job types are provided by a user.

6. The method of claim 1, wherein, the selected health check job types are sequentially executed one at a time.

7. The method of claim 1, further comprising:
   determining, for each of the plurality of health check job types selected, whether a selected health check job type has been previously executed within a reference period;
   when the selected health check job type is determined to have been previously executed within the reference period, determining not to execute the selected health job type; and
   when the selected health check job type is determined not to have been previously executed within the reference period, executing the selected health job type.

8. The method of claim 1, further comprising:
   determining whether a health check job type is currently being executed on the network component device;
   when the health check job type is determined to be currently executed on the network component device, causing another health check job type assigned to be performed on the network component device to wait until the health check job type currently being executed is completed; and upon completion of the health check job type currently being executed, executing the other health check job type.

* * * * *